May 21, 1963   R. GOTTSCHALD   3,090,079
METHOD OF MAKING BUSHINGS FOR BALL AND SOCKET JOINTS
Filed Nov. 3, 1959
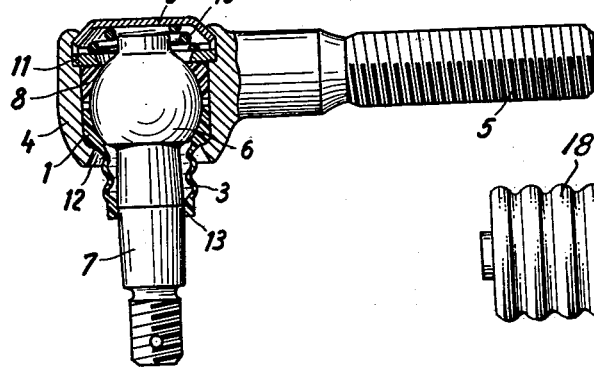
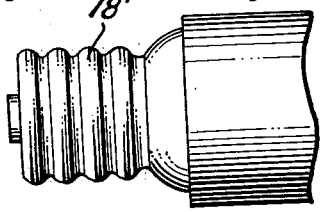
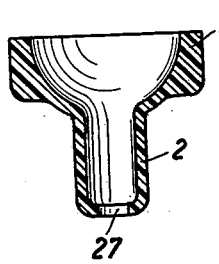
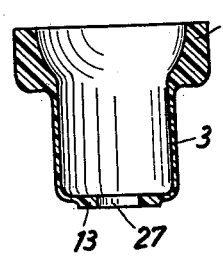
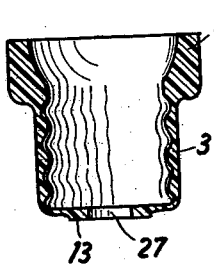
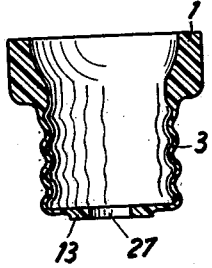
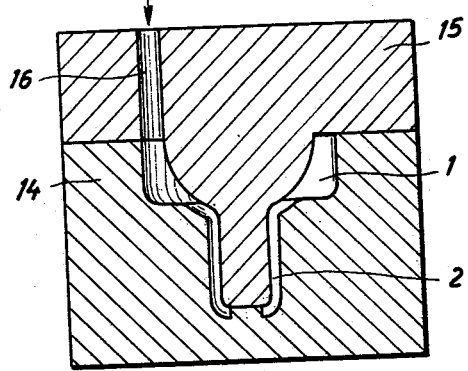
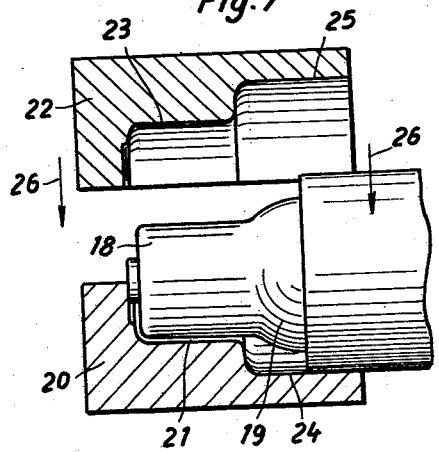
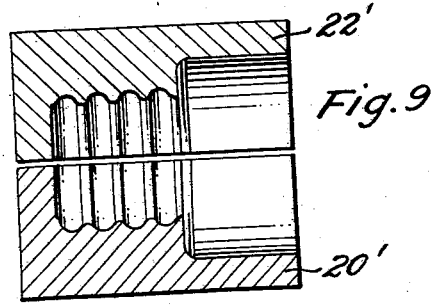
Inventor
RUDOLPH GOTTSCHALD
BY
ATTORNEYS 3,090,079
Patented May 21, 1963

3,090,079
METHOD OF MAKING BUSHINGS FOR BALL AND SOCKET JOINTS
Rudolf Gottschald, Osterrath, Germany, assignor to Viktor Langen, Dusseldorf-Oberkassel, Germany
Filed Nov. 3, 1959, Ser. No. 850,646
Claims priority, application Germany Nov. 3, 1958
3 Claims. (Cl. 18—59)

This invention relates to a method of manufacturing a bearing bushing of synthetic material from the class consisting of cross-linked polyurethanes for the ball head on the pin of a ball and socket joint of the kind in which, at the side on which the pin extends from the socket, the bearing bushing has a cylindrical or bellows-like extension for sealing the socket, the extension having a collar which closely surrounds the ball pin.

Ball and socket joints, such as, for example, are used in the steering gear of power vehicles, are known which are provided with bearing bushings of synthetic material in which the head of the ball is carried in the socket. The object of these bearings of synthetic material is to reduce the attention required by the ball and socket joint, that is to say to make greasing of the joint unnecessary. Whereas in the case of joints which have to be greased the grease which has been used up together with the dirt is forced out of the joint by the freshly introduced grease, a cleaning process of this kind is not necessary for joints which do not have to be greased. Therefore, in such joints, particular attention must be paid to the sealing of the joint at the place where the ball pin extends from the socket in order to prevent penetration of dirt and dust as far as possible.

The sealing of the ball and socket joint at the end where the ball pin extends from the socket, can be effected by a dust cap which is fixed on the ball pin and of which the inner edge surface bears against the spherical or ball-shaped outer surface of the socket and, on movement of the pin relative to the socket, slides on the socket. A seal of this kind is not sufficient to meet all requirements owing to the movement of the sealing cap relative to the socket. By using a seal in the form of a bellows which closely surrounds the ball pin and is fixed to the socket by means of a collar, the relative movement between the seal and the socket is avoided because the bellows follows the relative movement between the ball pin and the socket, by being correspondingly deformed. An absolutely tight seal is, therefore, formed in this way. It has the disadvantage, however, that the socket must have a particular external shape and the fixing of the bellows to the socket represents an additional operation which, when the ball and socket joint is made on mass production lines, represents an appreciable increase in cost.

It has also previously been proposed to provide a bellows-like extension at the outlet opening of the socket or of a lining of resilient or elastic material therein as a seal for the opening in the socket, the extension having a collar which closely surrounds the ball pin. The introduction of a seal of this nature has in practice not been successful owing to the difficulty of making the sealing bellows in one piece with the bearing bushing in the socket.

According to the invention, a bearing bushing having a sealing cylinder or bellows for the ball of a ball and socket joint is made by first casting or moulding a bearing bushing with a sleeve-like extension at the opening for the ball pin, the extension having a bottom opening and its internal and external diameters being smaller than the corresponding diameters of the cylinder or bellows to be formed, after which the extension is deformed to the final shape of the cylinder or bellows by widening it and pressing it, and its hardness altered. The alteration in hardness can take place at the same time as the shaping of the extension to its final form. Owing to the alteration in hardness, which consists in reducing the hardness, the elasticity of the cylinder or bellows is increased.

The invention is based on the idea that a cast or moulded mass of cross-linked polyurethanes which is free from bubbles can be produced only with a wall thickness equal to or above a definite minimum thickness. Since this minimum wall thickness is too great for use in making a sealing cylinder or bellows, it is not possible to cast or mould the bearing bushing in one piece with the sealing cylinder or bellows. It is possible to reduce the Shore hardness of cross-linked polyurethanes after casting and heating by a following pressing process. If use is made of this process to reduce the wall thickness of the cylinder or bellows, then the hardness of the bearing bushing is insufficient to form a satisfactory bearing for the ball head of the pin.

By means of the process of the present invention, a satisfactory casting free from bubbles can be obtained so that the bearing bushing may have a suitably great wall thickness and yet be a bellows of sufficient elasticity and small wall thickness.

The invention is illustrated, by way of example, in the accompanying drawing, in which:

FIGURE 1 shows a vertical section through a ball and socket joint;

FIGURE 2 shows a vertical section through the bearing bushing together with the sleeve-like extending after casting or moulding;

FIGURE 3 is a vertical section through a finished bearing bushing having an extension with smooth cylindrical surfaces;

FIGURES 4 and 5 are vertical sections through a finished bearing bushing having extensions with corrugated surfaces;

FIGURE 6 is a vertical section showing the mould in which the material is cast;

FIGURE 7 illustrates the process by which the extension is formed;

FIGURE 8 shows a corrugated core used in making one of the embodiments of the invention; and FIGURE 9 is a sectional view of a corrugated die used in making another embodiment of the invention.

Referring to the drawing, the ball and socket joint illustrated in FIGURE 1 consists of a socket 4 and a rod 5 on the socket which can be used, for example, as a connecting means. The ball head 6 of the pin 7 is mounted in the socket. Bearing bushings 8 and 1 are fitted in the socket as bearings for the ball 6. These bushings consist of synthetic material of the class of cross-linked polyurethanes and have elastic properties. The socket on the side remote from that on which the pin projects is closed by a cover 9. Between the cover 9 and the bearing bushing 8 is interposed a helical spring 10 which acts through a disc or washer 11 on the bearing bushing 8. The bearing bushing 1 has an extension 3 which passes through the outlet opening 12 which is provided in the socket for the passage of the ball pin and is formed in FIGURE 1 as a corrugated bellows. The bellows has a collar 13 which closely embraces the pin 7.

FIGURE 2 shows the bearing bushing 1, together with the sleeve-like extension 2 from which the bellows is formed after the extension has been cast or moulded. The extension 2 has a smaller internal and external diameter than correspond to the cylinder or bellows 3 to be formed.

The casting or moulding of the bearing bushing, together with the sleeve-like extension takes place in a mould 14 provided with a core 15. The casting inlet is indicated by the reference numeral 16 and the inflow of material is indicated by the arrow 17.

After casting, as shown in FIGURE 7, a core 18 is introduced into the sleeve-like extension 2 so that the extension is widened. The external diameter and the external shape of the core part 18 correspond exactly to the internal diameter and the internal shape of the cylinder or bellows to be formed. The core part 19 has a shape and size corresponding to the internal shape and size of the bearing bushing 1, and effects no deformation of the cast bearing bushing 1. Following the introduction of the core 18 into the sleeve-like extension, the core, together with the bearing bushing and its extension is placed in a die part 20, the internal diameter and the internal shape of the part 21 of which exactly correspond to the external diameter and the external shape of the cylinder or bellows to be formed, after which the die part 22, the internal diameter and internal shape of the part 23 of which also exactly correspond to the external diameter and the external shape of the cylinder bellows to be formed, is placed on the die part 20 and pressed against it. The direction of pressure is indicated by the arrows 26 in FIGURE 7. The internal diameter and the internal shape of the die parts 24 and 25 exactly correspond to the external diameter and the external shape of the bearing bushing 1, so that this is not affected by the pressing process. The die parts 20 and 22 are so designed that the cylinder or bellows can be heated during the pressing and for this purpose are, for example, electrically heated, in which case electric heating wires can be provided in the walls of these parts; such heating wires are, however, not illustrated in the drawing.

During the forming of the cylinder or bellows by means of the core and die the collar 13 is also brought into the desired form and, if necessary, the bottom opening 27 is widened.

On introducing the core 18 the sleeve-like extension from which the cylinder is formed, is elastically deformed. Owing to the pressing process in combination with the heating, the elastic deformation changes into a plastic deformation, that is to say after the core has been withdrawn the cylinder or bellows formed maintains its shape and does not return to its original form. The bearing bushing 1 is not affected by the pressing process and, therefore, maintains its shape and properties which it has received during the casting for moulding.

FIGURES 3 to 5 show finished bearing bushing having a sealing cylinder 3 which, in FIGURE 3, has a smooth cylindrical form, and in FIGURE 4 has a form of bellows with corrugations on the inside, whereas in FIGURE 5 it is in the form of a bellows with corrugations both on the inside and on the outside.

Thus, to make the bushing illustrated in FIG. 4, the die parts 20 and 22 are used with the corrugated core 18' (FIG. 8) and to make the bushing illustrated in FIG. 5, the corrugated core 18' is used with the corrugated die parts 20', 22' (FIG. 9).

I claim:
1. A method of making a spherical bushing having an integral sleeve and collar for surrounding the ball pin of a ball and socket joint, comprising the steps of:
  (a) placing cross-linked polyurethane into a mold having a core to form a spherical bushing having an integral sleeve-like extension;
  (b) removing the spherical bushing and its sleeve-like extension from the mold;
  (c) inserting a core into the sleeve-like extension to thereby widen the extension by elastic deformation;
  (d) placing the core, together with the elastically deformed sleeve-like extension into a die having an internal diameter and shape corresponding to the external diameter and shape of the extension to be formed;
  (e) simultaneously applying pressure and heat to the extension and core to thereby change the elastic deformation into a plastic deformation, whereby the hardness of the extension is reduced;
  (f) removing the deformed extension and core from the die; and
  (g) removing the core from the deformed sleeve-like extension.

2. A method of making a spherical bushing having an integral sleeve-like extension and collar for surrounding the ball pin of a ball and socket joint, comprising the steps of:
  (a) placing cross-linked polyurethane into a mold having a core to form a spherical bushing having an integral sleeve-like extension;
  (b) removing the spherical bushing and its sleeve-like extension from the mold;
  (c) inserting a corrugated core into the sleeve-like extension to thereby widen the extension by elastic deformation;
  (d) placing the corrugated core, together with the elastically deformed sleeve-like extension into a cylindrical die having an internal diameter corresponding to the external diameter of the extension to be formed;
  (e) simultaneously applying pressure and heat to the extension and core to thereby change the elastic deformation into a plastic deformation whereby the hardness of the extension is reduced;
  (f) removing the deformed extension and core from the die; and
  (g) removing the corrugated core from the deformed sleeve-like extension.

3. A method of making a spherical bushing having an integral bellow-type sleeve for surrounding the ball pin of a ball and socket joint, comprising the steps of:
  (a) placing cross-linked polyurethane into a mold having a core to form a spherical bushing having an integral cylindrical-shaped sleeve;
  (b) removing the spherical bushing and its sleeve from the mold;
  (c) inserting a corrugated core into the sleeve to thereby widen the sleeve by elastic deformation;
  (d) placing the corrugated core, together with the elastically deformed sleeve into a die having a corrugated internal surface corresponding to the shape of the sleeve to be formed;
  (e) simultaneously applying pressure and heat to the sleeve and core to thereby change the elastic deformation into a plastic deformation, whereby the sleeve is formed into a bellows and the hardness of the sleeve is reduced;
  (f) removing the bellows-shaped sleeve and corrugated core from the die; and
  (g) removing the corrugated core from the bellows-shaped sleeve.

References Cited in the file of this patent

UNITED STATES PATENTS

| | | |
|---|---|---|
| 2,230,192 | Ross et al. | Jan. 28, 1941 |
| 2,246,086 | Austin | June 17, 1941 |
| 2,246,092 | Gilman | June 17, 1941 |
| 2,248,898 | Ross et al. | July 8, 1941 |
| 2,299,520 | Yant | Oct. 20, 1942 |
| 2,560,024 | Brown | July 10, 1951 |
| 2,908,943 | Miller | Oct. 20, 1959 |

FOREIGN PATENTS

| | | |
|---|---|---|
| 744,327 | Great Britain | Feb. 1, 1956 |